United States Patent
Ci

(10) Patent No.: US 11,410,674 B2
(45) Date of Patent: Aug. 9, 2022

(54) METHOD AND DEVICE FOR RECOGNIZING STATE OF MERIDIAN

(71) Applicant: Zhonghua Ci, Beijing (CN)

(72) Inventor: Zhonghua Ci, Beijing (CN)

( * ) Notice: Subject to any disclaimer, the term of this patent is extended or adjusted under 35 U.S.C. 154(b) by 252 days.

(21) Appl. No.: 16/661,711

(22) Filed: Oct. 23, 2019

(65) Prior Publication Data
US 2020/0135228 A1 Apr. 30, 2020

(30) Foreign Application Priority Data
Oct. 24, 2018 (CN) .......................... 201811244411.X

(51) Int. Cl.
*G10L 25/51* (2013.01)
*G10L 15/02* (2006.01)
*G10L 15/22* (2006.01)
*G10L 25/18* (2013.01)
*G10L 25/21* (2013.01)
(Continued)

(52) U.S. Cl.
CPC .............. *G10L 25/51* (2013.01); *G10L 15/02* (2013.01); *G10L 15/22* (2013.01); *G10L 25/18* (2013.01); *G10L 25/21* (2013.01); *G10L 25/66* (2013.01); *G10L 25/90* (2013.01); *G10L 21/0232* (2013.01)

(58) Field of Classification Search
CPC ......... G10L 25/66; G10L 15/00; G10L 15/02; G10L 15/22
See application file for complete search history.

(56) References Cited

U.S. PATENT DOCUMENTS

| 5,774,846 A * | 6/1998 | Morii ..................... G10L 19/06 704/202 |
| 2005/0182624 A1* | 8/2005 | Wu ..................... G10L 21/0208 704/233 |

(Continued)

OTHER PUBLICATIONS

Liang et al. ,"An auscultatory technique of Chinese medicine: Pattern recognition based on timbre of human-voice matching with standardized patterns of sound from Bianzhong of Marquis Yi of Zeng (***)." 2013 IEEE International Conference on Bioinformatics and Biomedicine. IEEE (Year: 2013).*

*Primary Examiner* — Samuel G Neway
(74) *Attorney, Agent, or Firm* — Cantor Colburn LLP

(57) ABSTRACT

The present application relates to a method and device for recognizing the state of a human body meridian by utilizing a voice recognition technology, the method comprising: receiving an input voice of a user; preprocessing the input voice; extracting a stable feature of the preprocessed input voice; primarily classifying the stable feature on the basis of a feature recognition model, and determining a basic classification pitch, wherein the basic classification pitch comprises Gong, Shang, Jue, Zhi and Yu (respectively equivalent to do, re, mi, sol and la); secondarily classifying the stable feature on the basis of the feature recognition model, and determining a secondary classification tone in the basic classification pitch; and recognizing the state of a meridian according to the secondary classification tone. The method for recognizing the state of a human body meridian of the present invention can accurately recognize the state of a human body meridian by classifying individual voices, thus solving the problem that conventional voice recognition and classification are completely dependent on human experience.

8 Claims, 3 Drawing Sheets

(51) Int. Cl.
*G10L 25/90* (2013.01)
*G10L 25/66* (2013.01)
*G10L 21/0232* (2013.01)

(56) References Cited

U.S. PATENT DOCUMENTS

| | | | | |
|---|---|---|---|---|
| 2007/0005357 | A1* | 1/2007 | Moran | G10L 25/66 |
| | | | | 704/246 |
| 2008/0059163 | A1* | 3/2008 | Ding | G10L 21/0208 |
| | | | | 704/226 |
| 2012/0265024 | A1* | 10/2012 | Shrivastav | G16H 50/30 |
| | | | | 600/300 |
| 2014/0122063 | A1* | 5/2014 | Gomez Vilda | G10L 17/02 |
| | | | | 704/200.1 |
| 2014/0169534 | A1* | 6/2014 | Bentley | G10L 25/48 |
| | | | | 379/45 |
| 2015/0039303 | A1* | 2/2015 | Lesso | G10L 15/20 |
| | | | | 704/233 |
| 2017/0053665 | A1* | 2/2017 | Quatieri, Jr. | G10L 25/66 |
| 2019/0189148 | A1* | 6/2019 | Levanon | G10L 25/66 |
| 2019/0290214 | A1* | 9/2019 | Ci | A61B 5/742 |
| 2020/0135228 | A1* | 4/2020 | Ci | G10L 25/90 |

\* cited by examiner

METHOD AND DEVICE FOR RECOGNIZING STATE OF MERIDIAN

TECHNICAL FIELD

The present application relates to the field of audio processing, in particular to a method and device for recognizing the state of a meridian.

BACKGROUND ART

As everyone knows, the five internal organs (spleen, lung, liver, heart and kidney) of a human body respectively correspond to the five pitches (Gong, Shang, Jue, Zhi and Yu (respectively equivalent to do, re, mi, sol and la)) in classical music. Each one of the five pitches is subdivided into five tones, forming 25 musical scales corresponding to the states of 25 viscera and meridians. "Five Zang-organs harmonize pitch", as a basis for determining the state of a meridian, can prompt what kind of meridian and dietary conditioning should be performed to finally achieve the purpose of performing physiological conditioning and evaluation on an acquired parameter.

However, conventional voice classification is completely dependent on expert experience, which is difficult and has a high individual requirement for a subject. With the development of the voice signal processing technology and the mode recognition technology, how to utilize the voice recognition technology to classify the state of a human body meridian is a problem urgent to be solved in the art.

The information disclosed in the background art part of the present application is only intended to deepen the understanding to the common background art of the present application, but shall not be deemed to admit or imply in any form that the information forms commonly known prior art for a person skilled in the art.

SUMMARY OF THE INVENTION

The main object of the present application is to provide a method and device for recognizing the state of a human body meridian by utilizing a voice recognition technology.

In order to solve the above-described problem, the present application relates to a method for recognizing the state of a meridian, the method comprising: receiving an input voice of a user; preprocessing the input voice; extracting a stable feature of the preprocessed input voice; primarily classifying the stable feature on the basis of a feature recognition model, and determining a basic classification pitch, wherein the basic classification pitch comprises Gong, Shang, Jue, Zhi and Yu (respectively equivalent to do, re, mi, sol and la); secondarily classifying the stable feature on the basis of the feature recognition model, and determining a secondary classification tone in the basic classification pitch; and recognizing the state of a meridian according to the secondary classification tone.

Further, the step of receiving an input voice of a user comprises: sequentially displaying first to fifth prompt words and starting to receive first to fifth input voices of a user; after the first to fifth input voices of the user are received, recognizing the received first to fifth input voices to be first to fifth user words; respectively comparing the first to fifth user words with the first to fifth prompt words; and integrating the user words matched with the prompt words to be an audio file as the input voice.

Still further, the first to fifth prompt words can respectively be: "do", "re", "mi", "sol" and "la".

Further, the step of preprocessing the input voice comprises: performing noise reduction on the input voice, and performing voice signal pre-emphasis on the noise-reduced input voice.

Still further, the noise reduction process comprises: removing background noise and current noise in the input voice; and the voice signal pre-emphasis comprises: improving a high frequency voice signal.

Further, the step of extracting a stable feature of the preprocessed input voice may comprise: transforming the sequence of the input voice into a frequency domain feature through Fourier transform to obtain a signal power spectrum; utilizing discrete cosine transform to remove the correlation between signal dimensions to obtain a 24-dimensional feature of a sample; and utilizing a manifold learning method to reduce the 24-dimensional feature to be a 12-dimensional feature to obtain the stable feature.

Further, the step of establishing a feature recognition model comprises: establishing a directed Gaussian mixture graphical model for the basic classification pitch; and utilizing a Bayesian graphical learning algorithm to train the directed Gaussian mixture graphical model.

The present application further relates to a device for recognizing the state of a meridian, the device comprising: a receiving module, for receiving an input voice of a user; a preprocessing module, for preprocessing the input voice; an extraction module, for extracting a stable feature of the preprocessed input voice; a primary classification module, for primarily classifying the stable feature on the basis of a feature recognition model, and determining a basic classification pitch, wherein the basic classification pitch comprises Gong, Shang, Jue, Zhi and Yu (respectively equivalent to do, re, mi, sol and la); a secondary classification module, for secondarily classifying the stable feature on the basis of the feature recognition model, and determining a secondary classification tone in the basic classification pitch; and a determination module, for recognizing the state of a meridian according to the secondary classification tone.

In addition, the present application further relates to a mobile device, comprising a memory, a processor and a program stored in the memory and capable of running on the processor, wherein the steps of the method for recognizing the state of a meridian as described above can be realized when the processor executes the program.

Further, the mobile device may comprise a tablet computer, a notebook, a mobile desktop computer and/or a mobile phone.

The beneficial effects of the present application are: the method for recognizing the state of a human body meridian of the present invention can accurately recognize the state of a human body meridian by classifying individual voices, and solves the problem that conventional voice recognition and classification are completely dependent on human experience. The method for recognizing the state of a human body meridian of the present invention utilizes the voice signal processing technology and the mode recognition technology, uses modern technologies to classify a voice signal and determine the state of an individual body, and can reduce the dependence of individual voice classification on professional experience, thus having a positive effect.

BRIEF DESCRIPTION OF THE DRAWINGS

The drawings forming a part of the present application provide a further understanding to the present application, enabling the other features, objects and advantages of the present application to be more obvious. The exemplary embodiments of the present application, the drawings and the descriptions thereof are used to explain the present application, but are not intended to unduly limit the present application. In the drawings.

DETAILED DESCRIPTION OF THE EMBODIMENTS

To enable a person skilled in the art to better understand the solution of the present application, the technical solutions in the embodiments of the present application will be clearly and completely described hereafter in combination with the drawings in the embodiments of the present application. It is apparent that the described embodiments are only a part of the embodiments of the present application, but not the whole. On the basis of the embodiments of the present application, all the other embodiments obtained by a person skilled in the art without involving an inventive effort should be all concluded in the protection scope of the present application.

In addition, the terms "install", "dispose", "be provided with", "connected", "be configured to" should be understood in a broad sense. For example, the term "connected" can be fixedly connected, detachably connected, or integrally constructed, can be mechanically connected, or electrically connected, and can also be directly connected, or indirectly connected via an intermediate medium, or internally communicated between two devices, elements or components. A person skilled in the art may understand the specific meanings of the above-described terms in the present application according to specific circumstances.

Figure 1:
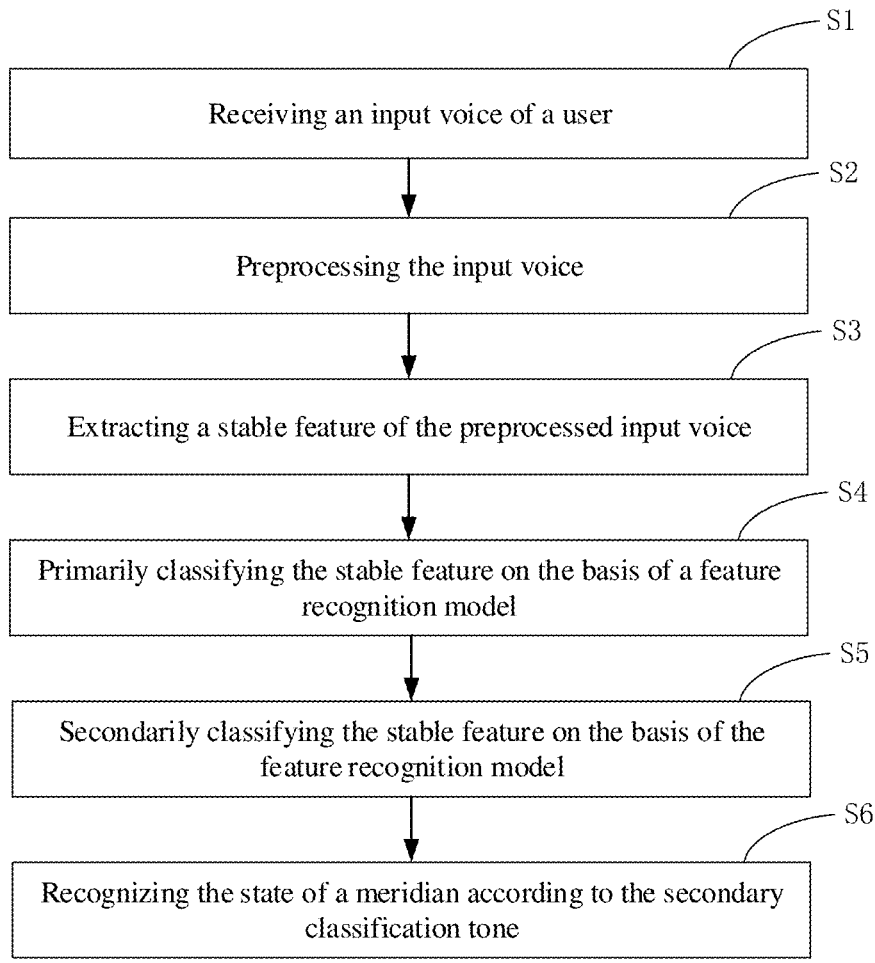
FIG. 1 is a flow chart of the method for voice acquisition according to the embodiment of the present application.
Figure 2:
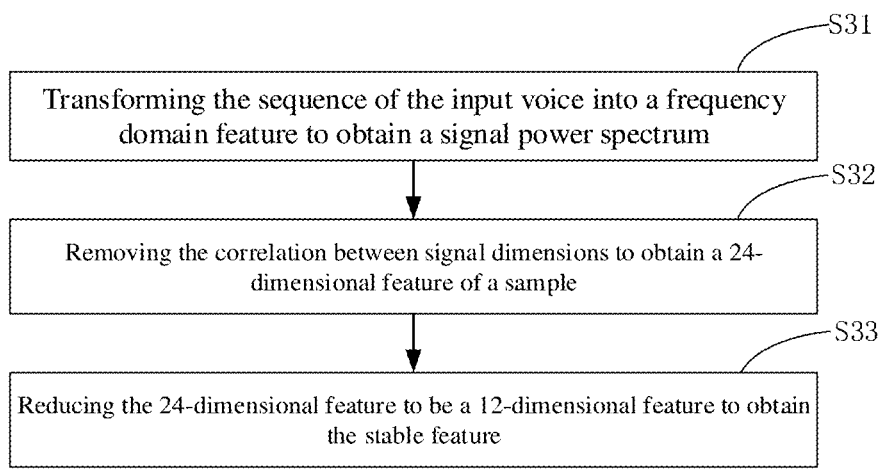
FIG. 2 is a flow chart of the stable feature extraction process according to the embodiment of the present application.
Figure 3:
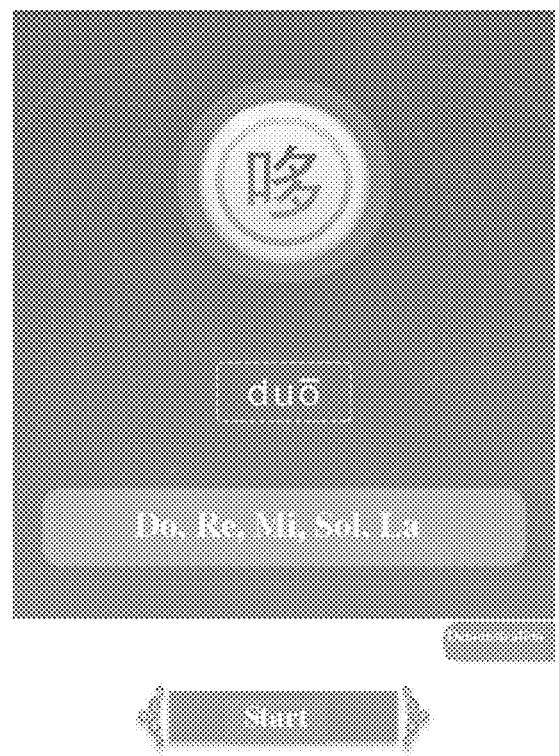
FIG. 3 is a schematic view of the first software interface according to the embodiment of the present application.
Figure 4:
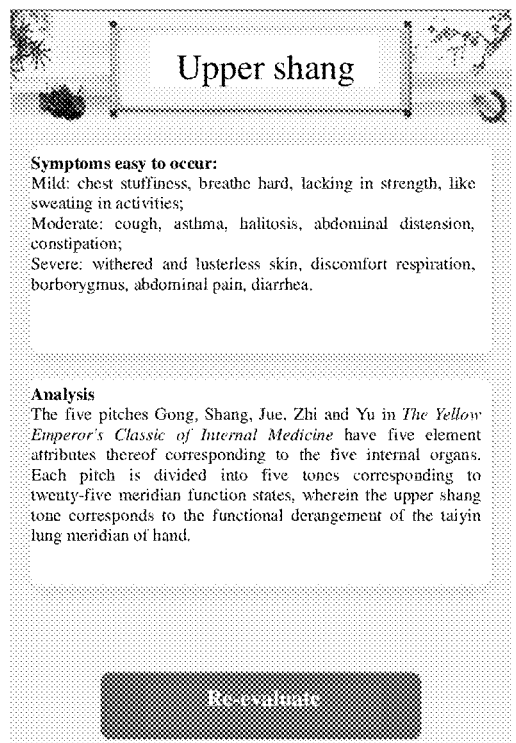
FIG. 4 is a schematic view of the second software interface according to the embodiment of the present application.

It should be noted that, in the case of no conflicts, the embodiments in the present application and the features in the embodiments can be mutually combined. The present application will be elaborated hereafter with reference to the drawings and in combination with the embodiments, wherein FIG. 1 is a flow chart of the method for voice acquisition according to the embodiment of the present application; FIG. 2 is a flow chart of the stable feature extraction process according to the embodiment of the present application; FIG. 3 is a schematic view of the first software interface according to the embodiment of the present application; and FIG. 4 is a schematic view of the second software interface according to the embodiment of the present application.

As shown in FIG. 1, the method for information interaction according to the first embodiment of the present application may comprise steps S1-S6:

In the step S1, the present application first receives an input voice of a user; specifically, the present application displays the first prompt word, for example "do", in the middle of the program interface, and starts to receive the voice of the user at the lower part of the program interface, for example, a voice input button can be turned on, and a hardware driver, for example a microphone, bound or matched with the program can be accessed.

Further, in order to improve the voice recognition rate and accuracy rate of the user, a pinyin corresponding to the first prompt word, for example the pinyin "duo", can be displayed below the first prompt word, as shown in FIG. 3.

Next, after the first input voice of the user is received, the present application compares the received first input voice with the first prompt word, and determines whether the first input voice is matched with the first prompt word. Specifically, the first input voice can be converted into waveform data; then the waveform data is compared with the waveform data corresponding to the first prompt word to determine whether the first input voice is matched with the first prompt word.

If the first input voice is not matched with the first prompt word, then the present application continues to execute the step of receiving the first input voice, namely displaying the first prompt word and starting to receive the first input voice of the user.

If the first input voice is matched with the first prompt word, then the present application starts to receive a second input voice of the user. Specifically, the present application displays the second prompt word, for example "re", in the middle of the program interface, and starts to receive the voice of the user at the lower part of the program interface, for example, a voice input button can be turned on, and a hardware driver, for example a microphone, bound or matched with the program can be accessed.

Further, in order to improve the voice recognition rate and accuracy rate of the user, a pinyin corresponding to the second prompt word, for example the pinyin "lai", can be displayed below the second prompt word.

By analogy, the present application can sequentially receive the first to fifth input voices of the user, wherein the input voices include but not limited to: "do", "re", "mi", "sol" and "la". The first to fifth input voices are respectively compared with the first to fifth prompt words; the input voices of the user matched with the prompt words are integrated to be an audio file, for example, integrated to be a WAV format file; and the file is uploaded to a remote server for further processing.

Next, in the step S2, the present application preprocesses the input voice and eliminates background noise; under the influence of the speech rate of a speaker, an original voice signal contains a part having no human voices; such a part should not influence a classification result; and therefore, the present application needs to eliminate the noise from the signal. As an embodiment of the present application, an original voice signal acquired by a voice recoding device is always influenced by background noise and device current noise; therefore, noise reduction should be performed on the voice signal.

In addition, the power spectrum density of output noise of a frequency discriminator increases with the square of frequency (the low frequency noise is quiet, and the high frequency noise is loud), thus the low frequency signal-to-noise ratio of the signal is great, and the high frequency signal-to-noise ratio is obviously insufficient, with the result that high frequency transmission is weakened and becomes hard; therefore, the present application performs voice signal pre-emphasis on the noise-reduced input voice; the object of pre-emphasis is to improve the high frequency part, and smooth the signal, thus facilitating frequency spectrum analysis or sound channel parameter analysis.

The technical means adopted for preprocessing the voice is an existing process, and the adopted noise reduction method is common. Therefore, the present application will not describe in detail the voice preprocessing and noise reduction processes.

Next, in the step S3, a stable feature of the preprocessed input voice is extracted.

As shown in FIG. 2, the specific stable feature extraction steps may comprise step S31-S33.

In the step S31, first a preliminary feature is obtained by sampling; then the sequence of the input voice is transformed into a frequency domain feature through Fourier transform to obtain a signal power spectrum, for example, the time and spatial sequences of the voice can be transformed into a frequency domain feature through Fourier transform, and then transformed into a signal power spectrum; and the formed sample examples are: [0.1734, 0.0673 0.0163 0.0021 0.0103 0.0088 0.0085 0.0053 0.0018 0.0113 0.0083 0.0053 0.0085 0.0088 0.0103 0.0021].

The features not related to the specific content (for example, the specific read word) of the human voice are extracted; and the features related to individual body (not related to specific pronunciation) are searched, for example, the shape of the sound channel is reflected on the sound spectrum feature; the sound is sampled; and the power spectrum of the sound is extracted through fast Fourier transform on the basis of sampling as a system feature.

In the step S32, discrete cosine transform is utilized to remove the correlation between signal dimensions to obtain a 24-dimensional feature of the sample; specifically, the correlation between signal dimensions can be removed to obtain the 24-dimensional feature description of the sample; and the formed 24-dimensional sample examples are: [7.1433 3.0949 −3.3847 −0.2416 −2.6995 1.6743 12.5590 0.2138 −1.2205 −1.7869 0.1487 −0.5694 2.7566 −0.8829 3.8074 1.9649 2.3419 −2.8923 −1.7200 −2.6096 −0.3144 −0.1092 −0.0778 0.0293]. In the present application, the "dimension" in the 24-dimensional feature refers to intervals having different frequencies; by testing the sound features of the intervals having different frequencies (which are overlapped, for example 100-1000, 800-1500, 1400-2000), it is found that the recognition result obtained through the processed 24-dimensional feature is highly coincident with a practical individual body recognition result. Therefore, the present application preferably adopts the 24-dimensional feature.

The sound is sampled; and voice energy spectrum is extracted through cosine transform on the basis of the sampling as a system feature.

Finally, in the step S33, a manifold learning method is utilized to reduce the 24-dimensional feature to be a 12-dimensional feature to obtain the stable feature. In other words, the data is processed with a manifold (nonlinear) data dimension reduction means; and the 24-dimensional original feature is reduced to be a 12-dimensional feature with a feature extraction means. The formed 12-dimensional sample examples are: [11.7878 10.7590 −0.6703 −5.9906 −1.4346 −0.5183 12.3516 −0.1463 −0.3148 −3.4235 −0.6919 −0.9450].

The stable feature is obtained through dimension reduction; feature dimension reduction refers to reduce the dimensions of the feature; and a method for removing over-fitting phenomenon is adopted to improve the precision of the model.

Next, with reference to FIG. 1 once again, after the stable feature of the preprocessed input voice is extracted, the present application continues to execute the step S4; the present application primarily classifies the stable feature on the basis of a feature recognition model, and determines a basic classification pitch, wherein the basic classification pitch comprises Gong, Shang, Jue, Zhi and Yu (respectively equivalent to do, re, mi, sol and la).

Specifically, in the present application, for each voice sample, a plurality of features (approximatively 1000) are obtained (namely human sound) through the step S3; for each feature, trained Gaussian mixture models (one Gaussian mixture model is trained for each five-pitch file) are utilized to respectively calculate posterior probability; for each feature (of the 1000 features), the basic classification pitch with the greatest posterior probability is selected; and finally, the basic classification pitch with the most stable features is determined, and the stable feature is classified into the basic classification pitch; and the primary classification result is finally obtained. The step of establishing a feature recognition model comprises: establishing a directed Gaussian mixture graphical model for the basic classification pitch; and utilizing a Bayesian graphical learning algorithm to train the directed Gaussian mixture graphical model; acquiring thousands of sound samples, analyzing the sound samples, and establishing a model having a corresponding relationship between the features of the sound samples and the states of meridians.

In addition, in the present application, the voice signals are divided into twenty-five categories in Gong, Shang, Jue, Zhi and Yu, wherein the major categories are five: Gong, Shang, Jue, Zhi and Yu; each major category consists of five subcategories; and each subcategory corresponds to different meridian states. as shown in table 1 below:

TABLE 1

| Five pitches | Twenty-five tones | Meridian |
| --- | --- | --- |
| Gong | Shaogong | Yangming stomach meridian of right foot |
| | Left jue gong | Yangming stomach meridian of left foot |
| | Upper gong | Taiyin spleen meridian of foot |
| | Jiagong | Yangming stomach meridian of right foot |
| | Dagong | Yangming stomach meridian of left foot |
| Jue | Right [shao] jue | Shaoyang gallbladder meridian of right foot |
| | Panjue | Shaoyang gallbladder meridian of left foot |
| | Upper jue | Jueyin liver meridian of foot |
| | Dijue | Shaoyang gallbladder meridian of right foot |
| | Dajue | Shaoyang gallbladder meridian of left foot |
| Yu | Shaoyu | Taiyang bladder meridian of right foot |
| | Zhiyu | Taiyang bladder meridian of left foot |
| | Upper yu | Shaoyin kidney meridian of foot |
| | Zhongyu | Taiyang bladder meridian of right foot |
| | Dayu | Taiyang bladder meridian of left foot |
| Shang | Shaoshang | Yangming large intestine meridian of |

TABLE 1-continued

| Five pitches | Twenty-five tones | Meridian |
| --- | --- | --- |
| | Left shang | Yangming large intestine meridian of left hand |
| | Upper shang | Taiyin lung meridian of hand |
| | Right shang | Yangming large intestine meridian of right hand |
| | Dishang | Yangming large intestine meridian of left hand |
| Zhi | Shaozhi | Taiyang small intestine meridian of right hand |
| | Panzhi | Taiyang small intestine meridian of left hand |
| | Upper zhi | Shaoyin heart meridian of hand |
| | Right zhi | Taiyang small intestine meridian of right hand |

Directly classifying a voice signal into twenty-five subcategories will cause the problem that the gap between categories is small; therefore, the voice of the same person would be easy to vacillate between a plurality of categories, with the result that the classification result is unstable. Therefore, the present application adopts the primary classification policy that the voice signal is first divided into five major categories and then the major categories are subdivided into subcategories, and then adopts secondary classification, namely the secondary classification polity. The present application reduces the classification efficiency to a certain extent, but improves the gap between categories during each time classification, thus improving the classification accuracy and stability.

Specifically, the step S5 can be executed, namely secondarily classifying the stable feature on the basis of the feature recognition model, and determining a secondary classification tone in the basic classification pitch.

Finally, in the step S6, the state of a meridian is recognized according to the secondary classification tone. Specifically, the present application can recognize a meridian according to the determined twenty-five tones in table 1, for example, the meridian corresponding to "upper shang" is taiyin lung meridian of hand; furthermore, the state of the meridian can be further analyzed; in addition, the symptoms easy to occur corresponding to the state of the meridian can also be displayed, such that the user can prevent in advance. The realization program interface is as shown in FIG. 4.

In addition, the present application further relates to a device for recognizing the state of a meridian, the device comprising: a receiving module, for receiving an input voice of a user; a preprocessing module, for preprocessing the input voice; an extraction module, for extracting a stable feature of the preprocessed input voice; a primary classification module, for primarily classifying the stable feature on the basis of a feature recognition model, and determining a basic classification pitch, wherein the basic classification pitch comprises Gong, Shang, Jue, Zhi and Yu (respectively equivalent to do, re, mi, sol and la); a secondary classification module, for secondarily classifying the stable feature on the basis of the feature recognition model, and determining a secondary classification tone in the basic classification pitch; and a determination module, for recognizing the state of a meridian according to the secondary classification tone.

In addition, the present application further relates to a hand held mobile terminal; the mobile terminal includes but not limited to a tablet computer, a notebook, a mobile desktop computer and a mobile phone; the mobile terminal comprises a memory, a processor and a program stored in the memory and capable of running on the processor, wherein any one step of the method for recognizing the state of a meridian as described above can be realized when the processor executes the program.

The computer program involved in the present application can be stored in a computer readable storage medium; the computer readable storage medium may comprise: any physical device capable of carrying a computer program code, a virtual device, a U-disk, a mobile hard disk, a magnetic disk, a compact disk, a computer memory, a read-only memory (ROM), a random access memory (RAM), an electrical carrier signal, a telecommunication signal, and other software distribution mediums.

Obviously, a person skilled in the art should understand that the above-described modules or steps of the present invention can be realized via a common computing device, and can be integrated on a single computing device or distributed on a network consisting of a plurality of computing devices; alternatively, the modules and the steps can be realized in the forms of computing device executable program codes; therefore, the modules and the steps can be stored in a storage device, and executed by a computing device, or can be respectively made into integrated circuit modules; alternatively, a plurality of the modules or steps therein can be made into a single integrated circuit module. Therefore, the present invention is not limited to any specific hardware and software combinations.

The descriptions above are only preferred embodiments of the present application, but not intended to limit the present application. For a person skilled in the art, the present application may have various changes and variations. Any modifications, equivalent substitutions, improvements and the like within the spirit and principles of the present application shall be concluded in the protection scope of the present application.

What is claimed is:

1. A method for recognizing a state of a meridian, wherein the state of the meridian is used to indicate a functional status of the meridian, comprising:
   receiving an input voice of a user;
   preprocessing the input voice;
   extracting a stable feature of the preprocessed input voice;
   primarily classifying the stable feature on the basis of a feature recognition model, and determining a basic classification pitch, wherein the basic classification pitch comprises Gong, Shang, Jue, Zhi and Yu (respectively equivalent to do, re, mi, sol and la);
   secondarily classifying the stable feature on the basis of the feature recognition model, and determining a secondary classification tone in the basic classification pitch; and
   recognizing the state of the meridian according to the secondary classification tone,
   wherein, said extracting a stable feature of the preprocessed input voice comprises:
   transforming a sequence of the input voice into a frequency domain feature through Fourier transform to obtain a signal power spectrum, wherein the sequence of the input voice includes time and spatial sequences of the input voice;

utilizing discrete cosine transform to remove a correlation between the signal dimensions of the signal to obtain a 24-dimensional feature of a sample, wherein the signal dimensions refer to intervals having different frequencies; and utilizing a manifold learning method to reduce the 24-dimensional feature to be a 12-dimensional feature to obtain the stable feature, wherein the step of receiving an input voice of a user comprises:

sequentially displaying first to fifth prompt words and starting to receive first to fifth input voices of a user;

after the first to fifth input voices of the user are received, recognizing the received first to fifth input voices to be first to fifth user words;

respectively comparing the first to fifth user words with the first to fifth prompt words; and integrating the user words matched with the prompt words to be an audio file as the input voice.

2. The method for recognizing a state of a meridian according to claim 1, wherein the first to fifth prompt words are respectively: "do", "re", "mi", "sol" and "la".

3. The method for recognizing a state of a meridian according to claim 1, wherein the step of preprocessing the input voice comprises: performing noise reduction on the input voice, and performing voice signal pre-emphasis on the noise-reduced input voice.

4. The method for recognizing a state of a meridian according to claim 3, wherein the noise reduction process comprises: removing background noise and current noise in the input voice; and the voice signal pre-emphasis comprises: improving a high frequency voice signal.

5. The method for recognizing a state of a meridian according to claim 1, wherein the feature recognition model is established by steps of:

establishing a directed Gaussian mixture graphical model for the basic classification pitch; and utilizing a Bayesian graphical learning algorithm to train the directed Gaussian mixture graphical model.

6. A device for recognizing a state of a meridian, wherein the state of the meridian is used to indicate a functional status of the meridian, comprising:

a receiving module, for receiving an input voice of a user;

a preprocessing module, for preprocessing the input voice;

an extraction module, for extracting a stable feature of the preprocessed input voice;

a primary classification module, for primarily classifying the stable feature on the basis of a feature recognition model, and determining a basic classification pitch, wherein the basic classification pitch comprises Gong, Shang, Jue, Zhi and Yu (respectively equivalent to do, re, mi, sol and la);

a secondary classification module, for secondarily classifying the stable feature on the basis of the feature recognition model, and determining a secondary classification tone in the basic classification pitch; and a determination module, for recognizing the state of a meridian according to the secondary classification tone, wherein said extracting a stable feature of the preprocessed input voice comprises:

transforming a sequence of the input voice into a frequency domain feature through Fourier transform to obtain a signal power spectrum, wherein the sequence of the input voice includes time and spatial sequences of the input voice;

utilizing discrete cosine transform to remove a correlation between signal dimensions to obtain a 24-dimensional feature of a sample, wherein the signal dimensions refer to intervals having different frequencies; and utilizing a manifold learning method to reduce the 24-dimensional feature to be a 12-dimensional feature to obtain the stable feature, wherein the receiving of an input voice of a user comprises:

sequentially displaying first to fifth prompt words and starting to receive first to fifth input voices of a user;

after the first to fifth input voices of the user are received, recognizing the received first to fifth input voices to be first to fifth user words;

respectively comparing the first to fifth user words with the first to fifth prompt words; and integrating the user words matched with the prompt words to be an audio file as the input voice.

7. A mobile device, comprising a memory, a processor and a program stored in the memory and capable of running on the processor, wherein the steps of the method for recognizing the state of the meridian as claimed in claim 1 can be realized when the processor executes the program.

8. The mobile device according to claim 7, wherein the mobile device comprises a tablet computer, a notebook, a mobile desktop computer and/or a mobile phone.

* * * * *